No. 657,436. Patented Sept. 4, 1900.
M. MORAN.
NUT LOCK.
(Application filed Feb. 8, 1900.)
(No Model.)
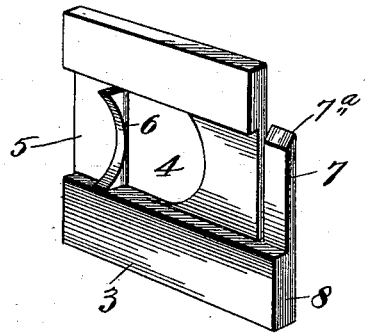
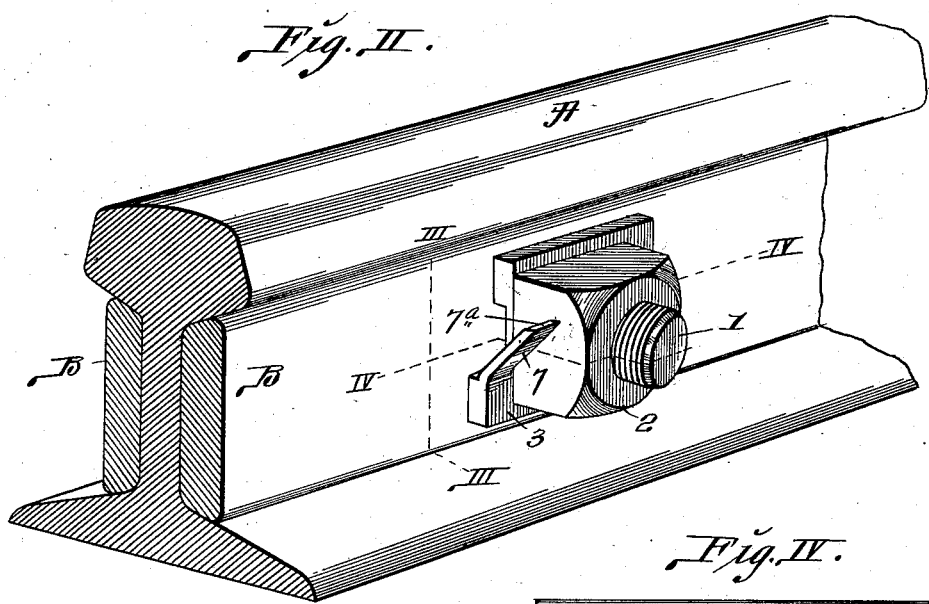
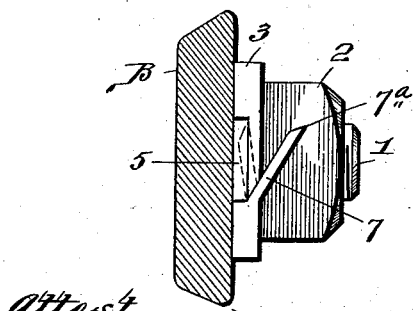
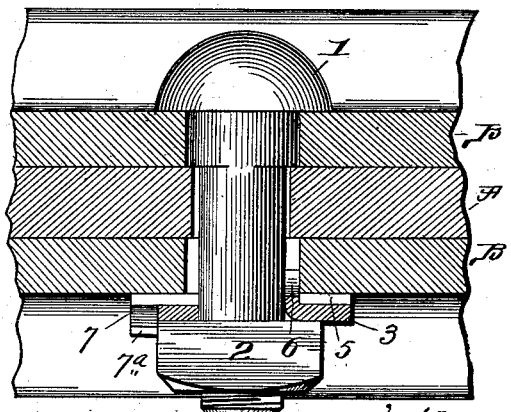
Inventor:— Michael Moran:— By Knight Brothers

UNITED STATES PATENT OFFICE.

MICHAEL MORAN, OF ST. LOUIS, MISSOURI, ASSIGNOR OF ONE-HALF TO FRANK H. GERVAIS, OF SAME PLACE.

NUT-LOCK.

SPECIFICATION forming part of Letters Patent No. 657,436, dated September 4, 1900.

Application filed February 8, 1900. Serial No. 4,451. (No model.)

*To all whom it may concern:*

Be it known that I, MICHAEL MORAN, a citizen of the United States, residing at the city of St. Louis, in the State of Missouri, have invented certain new and useful Improvements in Nut-Locks, of which the following is a full, clear, and exact description, reference being had to the accompanying drawings, forming part of this specification.

My invention relates to a nut-lock of that class known as "nut-lock washers" and in which a tongue is utilized that is adapted to be bent outwardly to engage the nut and hold it from turning.

One object of the invention is to produce a nut-lock washer of the character named in which the tongue may be again bent rearwardly in the event of its being desired to remove the nut at any time.

A further object of the invention is to provide a lip at the bolt-hole of the washer adapted to enter the bolt-hole in the fish-plate of a railway-rail to prevent the washer from turning.

My invention consists in features of novelty hereinafter fully described, and pointed out in the claims.

Figure I is a perspective view looking at the rear face of my improved washer. Fig. II is a perspective view of the nut-lock shown applied in locking position to the bolt and nut of a railway-rail joint. Fig. III is a side view of the nut-lock, the fish-plate being shown in cross-section. Fig. IV is a view, partly in horizontal section, taken on the line IV IV, Fig. II.

A designates a railway-rail, and B fish-plates.

1 designates a bolt provided with a nut 2. 3 is a nut-lock washer having a bolt-hole 4 and containing in its rear face a longitudinally-extending centrally-positioned groove 5. Struck from the body of the washer at the bolt-hole 4 is a lip 6, that is designed to enter the bolt-hole in the fish-plate B to hold the washer from turning, which is occasioned by reason of the bolt-hole in the fish-plate being universally of oblong configuration, so that there is space for the introduction of the lip 6 alongside of the bolt, while the bolt fits snugly in the fish-plate bolt-hole above and below.

7 designates the locking-tongue of the washer, which is carried by the extension 8 of the washer-body and is provided with a beveled end $7^a$ to receive the introduction of a cold-chisel or other implement by which the tongue may be forced outwardly.

It not infrequently becomes necessary to remove nuts from bolts to which they have been locked, and in order to provide for such removal it is necessary that the locking-tongue 7 and the washer by which it is carried be of such shape that the tongue may be forced backwardly beyond the rear plane of the nut. In order to provide for this backward movement of the locking-tongue, I provide the groove 5, of a width corresponding to the length of the tongue, said groove being continued across the tongue, so as to make the thickness of the washer at the groove and the thickness of the tongue approximately the same. Therefore when the tongue is bent backwardly after being bent outwardly to lock the nut it is possible to force the tongue back beyond the face plane of the washer, as seen by dotted lines in Fig. III, in order that the nut may be turned to remove it, whereas were the tongue and body of the washer of the same thickness throughout when the tongue was struck backwardly it would rebound from the fish-plate and could not be brought flush with the face plane of the washer and would consequently interfere with the removal of the nut.

In making the washers I propose to roll the blanks, in which operation the groove 5 is produced throughout the length of the washer.

I claim as my invention—

1. A nut-lock washer comprising a body provided with a longitudinal centrally-positioned groove in its rear face and a locking-tongue of a thickness corresponding to the thickness of the body of the washer at the location of said groove; substantially as described.

2. A nut-lock washer comprising a body provided with a longitudinal centrally-positioned groove, a locking-tongue of corresponding thickness to the body of said washer at the location of said groove, said tongue having a beveled end for the engagement of a tool, and a lip bent rearwardly from the body of said washer at the location of the bolt-hole therein, said lip being adapted to enter the bolt-hole in the fish-plate of a railway-rail, substantially as described.

MICHAEL MORAN.

In presence of—
 E. S. KNIGHT,
 M. P. SMITH.